United States Patent
Robinson

(10) Patent No.: US 7,329,360 B2
(45) Date of Patent: Feb. 12, 2008

(54) OIL RECOVERY AND ENVIRONMENTAL CLEANUP COMPOSITIONS COMPRISING A POLYETHYLENE/VINYL ACETATE COPOLYMER

(76) Inventor: Charles David Robinson, 862 Ramsden Drive, Albury, NSW 2640 (AU)

( * ) Notice: Subject to any disclaimer, the term of this patent is extended or adjusted under 35 U.S.C. 154(b) by 0 days.

(21) Appl. No.: 10/510,730

(22) PCT Filed: Apr. 3, 2003

(86) PCT No.: PCT/AU03/00404

§ 371 (c)(1),
(2), (4) Date: Oct. 8, 2004

(87) PCT Pub. No.: WO03/086623

PCT Pub. Date: Oct. 23, 2003

(65) Prior Publication Data

US 2005/0104028 A1    May 19, 2005

(30) Foreign Application Priority Data

Apr. 8, 2002  (AU) .................................... PS1612

(51) Int. Cl.
*B01D 15/00*    (2006.01)
(52) U.S. Cl. .................. 210/924; 210/922; 210/502.1; 525/148; 525/163; 521/79; 405/62; 405/63; 252/60
(58) Field of Classification Search ............... 525/148, 525/163; 521/79; 210/502.1, 922, 924; 405/62, 63; 252/60
See application file for complete search history.

(56) References Cited

U.S. PATENT DOCUMENTS

| | | | |
|---|---|---|---|
| 3,111,500 A * | 11/1963 | Bartl et al. | 524/563 |
| 3,862,963 A * | 1/1975 | Hoshi et al. | 502/402 |
| 3,960,722 A * | 6/1976 | Tomikawa et al. | 210/680 |
| 4,135,943 A | 1/1979 | Morishita et al. | |
| 4,206,080 A * | 6/1980 | Sato et al. | 502/62 |
| 4,446,254 A * | 5/1984 | Nakae et al. | 521/50.5 |
| 4,871,811 A * | 10/1989 | Gaku et al. | 525/148 |
| 4,931,484 A * | 6/1990 | Hovis et al. | 521/143 |
| 5,120,598 A * | 6/1992 | Robeson et al. | 442/409 |
| 5,432,000 A * | 7/1995 | Young et al. | 428/372 |
| 6,264,398 B1 * | 7/2001 | Yamada et al. | 405/62 |

FOREIGN PATENT DOCUMENTS

| BR | 8 906 461 A | 6/1991 |
|---|---|---|
| BR | 8906461 | * 6/1991 |

OTHER PUBLICATIONS

Supplementary European Search Report, EPO Application No. 03714527.3, Feb. 8, 2006.
Modern Plastics Encyclopedia, Oct. 1980 vol. 57, No. 10A, McGraw-Hill Inc. See p. 214-Lubricants, p. 214-220—Organic Peroxides.
When it comes to Organic Peroxides . . . Lucidol Pennwalt Chemicals Equipment Health Products, no date available.
The Effect of A-C Polyethylene Additives on Polypropylene Compounds; Allied Chemical, no date available.
PCT Search Report PCT/AU03/00404, no date available.

* cited by examiner

*Primary Examiner*—Charles Boyer
(74) *Attorney, Agent, or Firm*—Myers Bigel Sibley & Sajovec

(57) ABSTRACT

This invention relates to improvements in products and processes for cleaning up oil, chemical, or other hydrocarbon spills, and cleaning up the environment where such spills have occurred. In one aspect of the invention, there is provided an adsorbent polymeric composition which is oleophilic and capable of adsorption of other chemicals and hydrocarbons from both land and water, the adsorbent composition including polyethylene/vinyl acetate copolymer, catalyst, cross-linking agent, lubricant, blowing agent and a bulking agent. In a second aspect of the invention there is provided a method of manufacture of an adsorbent composition for use in retrieving and recycling oil, chemicals and hydrocarbons from land or water environments.

12 Claims, No Drawings

OIL RECOVERY AND ENVIRONMENTAL CLEANUP COMPOSITIONS COMPRISING A POLYETHYLENE/VINYL ACETATE COPOLYMER

RELATED APPLICATIONS

The present application is a 35 U.S.C. §371 national phase application of PCT International Application No. PCT/AU03/00404, having an international filing date of Apr. 3, 2003 and claiming priority to Australian Patent Application No. PS 1612, filed Apr. 8, 2002, the disclosures of which are incorporated herein by reference in their entireties. The above PCT International Application was published in the English language and has International Publication No. WO 03/086623 A1.

FIELD OF THE INVENTION

This invention relates to improvements in products and processes for cleaning up oil, chemical, or other hydrocarbon spills, and cleaning up the environment where such spills have occurred.

BACKGROUND

When an oil, chemical, or other hydrocarbon spill occurs in water an effort is made to absorb the oil, chemical, or other hydrocarbon and recover or retrieve it. This is done with the use of straw, hay, sawdust, absorbent pads or booms, "Kitty Litter" and several other adsorbents. However these adsorbents hold water as well as the oil. They therefore become saturated with a mixture of water and oil, chemical, or other hydrocarbon and sink. Generally speaking, only a small portion of the spilt oil, chemical, or other hydrocarbon is removed from the environment and recovered for further processing. The remainder of the oil, chemical, or other hydrocarbon spill is burnt, dispersed or treated with harsh chemicals, which themselves often cause further environmental damage. Much of the oil, chemical, or other hydrocarbon is trapped in the sunken adsorbent and may be slowly released into the water over a period of many years causing long-term environmental damage.

When an oil, chemical, or other hydrocarbon spill occurs on land a similar process using adsorbent booms or embankments is used but any excess which is not readily collected or retrieved is frequently washed away with water and/or detergents into the nearest drain, or burnt, or dispersed over a wide area.

One example of an environmentally sympathetic product used in the retrieval of oil, chemicals or other hydrocarbons from the environment is, for example, a product made from recycled waste plant fibres which are hydrophobic and oleophilic.

Other environmentally unsympathetic solutions for oil spills, for example, include the use of surfactants and dispersion agents.

The need for better recovery products and processes has been recognised worldwide. To date there has been no suitable product that will collect the oil, chemical, or other hydrocarbon, hold it in suspension, and cause it to separate from the water or soil so that it can be recovered or retrieved. It is an object of this invention to provide recovery products and processes suited to the efficient removal of oil, chemical or other hydrocarbon spills from a polluted environment.

SUMMARY OF THE INVENTION

In one aspect of the invention, there is provided an adsorbent polymeric composition which is oleophilic and capable of adsorption of other chemicals and hydrocarbons from both land and water, the adsorbent composition including polyethylene/vinyl acetate copolymer, catalyst, cross-linking agent, lubricant, blowing agent and a bulking agent.

One advantage of the composition according to the invention is that it is biodegradable and will be broken down by the action of ultraviolet light such as the ultraviolet rays of the sun. The final products of this biodegradation process are environmentally friendly and suitable for marine and/or land use.

In a preferred embodiment of this aspect of the invention, the adsorbent composition additionally includes one or more of anti microbial and antifungal agents, odour-masking agents, wetting agents and other suitable additives such as, for example, colouring agents and/or dyes.

A suitable catalyst is any substance or chemical that is capable of starting or kicking the cross linking of the polymeric composition during preparation and may be, for example, one or more of zinc stearate, lead, chromium, copper, cobalt, nickel, silica or zinc oxide or compounds and ionic forms thereof. Zinc oxide is preferred.

Preferably the zinc oxide is present in amounts of 0.2-2% w/w.

Preferably the polyethylene/vinyl acetate copolymer is made up of between about 2-30% vinyl acetate and is present in amounts of about 75-95% w/w. Preferably the vinyl acetate is ethyl vinyl acetate. The proportion of ethyl vinyl acetate present may be varied so as to ease the handling of the product according to the invention.

The melt flow index of suitable polyethylene/vinylacetate copolymers may be varied according to need, and according to the mode and manner of application. Preferably, the melt flow index of the copolymer is 0.2-600 g/10 min.

One suitable polyethylene/vinylacetate copolymer is Escorene™ LDPE available from a variety of sources.

A suitable cross linking agent is any substance or chemical that is capable of linking a cellular structure together and may be, for example, one or more diacyl peroxide, dialkyl peroxide, ketone peroxide, peroxydicarbonates, peroxyesters, tertiary alkyl hydra peroxides, tertiary amyl peroxides, acid chlorides, hydrogen peroxides whether they be organic or inorganic or dicumyl peroxide.

The cross linking agent is preferably peroxide, and more preferably, dicumyl peroxide. The peroxide is preferably used as a 99% solution but may be as low as a 20% solution. It is present in amounts of about 0.2-1.8% w/w.

One preferred lubricant according to the invention is a fatty acid, preferably stearic acid, but it will be appreciated, for example, that other fatty acids such as palmitic acid may be suited to the process. The lubricant may be present in amounts of about 0.5-1.75% w/w.

A suitable blowing agent may be any substance which alone or in combination with other substances is capable of producing a cellular structure in the adsorbent composition and is preferably present in amounts of about 1-7% w/w. Blowing agents include compressed gases that expand when pressure is released, soluble solids that leave pores when leached out, liquids that develop cells when they change to gases, and chemical agents that decompose or react under the influence of heat to form a gas. Chemical blowing agents range from simple salts such as ammonium or sodium bicarbonate to complex nitrogen releasing agents. A preferred blowing agent is azodicarbonamide.

Suitable bulking agents may include one or more of calcium carbonate, talc or any other substitute for these substances and may be present in amounts of about up to 25% w/w.

Suitable odour masking agents may include, for example, one or more of ti-tree oil, lavender oil and like substances and can be present in amounts of about up to 1% w/w. These substances, for example ti-tree oil, may also act as anti fungal and anti microbial agents.

Wetting agents may be useful in the manufacturing process to prevent dust generation and might be present in amounts of about up to 29% w/w. Suitable wetting agents may include, for example, white oil. This substance, for example, may have a secondary function as, for example, an insecticide.

In a second aspect of the invention there is provided a method of manufacture of an adsorbent composition for use in retrieving and recycling oil, chemicals and hydrocarbons from land or water environments, the method including the steps of forming an admixture for example, preferably in the form of a crepe of the components of the adsorbent composition of this invention, subjecting said admixture to pressure and optionally, temperature and forming the resultant cake into a shape or form suited to the environment of application of the composition.

Preferably, the admixture is treated at a temperature of between 70-400° C. and at pressure of about 12000 tonne/$m^2$. The duration of said treatment will vary according to the volume of adsorbent-composition being produced and the surface area of the vessel in which the treatment is occurring.

The adsorbent composition may be granulated after the heat and pressure treatment, but this granulation may also take place during the heat and pressure treatment, for example, by use of injection moulding equipment which forces the formation of a particularised product. Alternatively, the product may be shaped so as to form a sweep, boom or case as needs be. The adsorbent composition may also be applied in a liquid form in which case it will be necessary to add a co-solvent to the system to solubilise the composition. This form of the adsorbent composition is especially useful in environments where high wind is a factor.

In a third aspect of the invention the adsorbent composition prepared according to the method described hereinabove, having the characteristics described may be incorporated into a product such as a filter for off-site treatment of contaminated water or soil. In this aspect, the polluted water or soil could be removed by any suitable collection means and transported to said filter for treatment. The filter could then be treated for recovery of the pollutant and adsorbent composition, or the gelatinous mass arising from the treatment removed from the filter and treated independently of any filter structure.

In a fourth aspect of the invention, there is provided a method of treating an environment to remove an oil, chemical or other hydrocarbon pollutant including applying to said environment an adsorbent composition according to the invention.

DETAILED DESCRIPTION OF THE INVENTION

When the composition according to the invention, being an inert adsorbent, comes into contact with oil, chemical, or other hydrocarbon, it collects, and forms a gelatinous mass with, the oil, chemical, or other hydrocarbon without any chemical reaction taking place between the composition according to the invention and the oil, chemical, or other hydrocarbon. This allows the process to be easily reversed so that the gelatinous mass may be separated into adsorbent composition and the oil, chemical, or other hydrocarbon without the oil, chemical, or other hydrocarbon being affected by its contact with the adsorbent composition according to the invention.

When an oil, chemical, or other hydrocarbon spill occurs on water the oil, chemical, or other hydrocarbon tends to float for some time. The composition according to the invention after application by spreading or spraying on to the spill, will collect the oil, chemical, or other hydrocarbon suspended in or on water and hold it in suspension in the form of a gelatinous mass constituted by the oil, chemical or other hydrocarbon impregnated adsorbent. This gelatinous mass will not appreciably absorb water and hence in the instance where it is used to treat chemical or oil spills in or on water, will continue to float so that it can be recovered or retrieved. Surfactant may be used to at least partially fluidise the adsorbent composition to assist in spreading or spraying. The recovered or retrieved mass is then treated so as to desorb the oil, chemical, or other hydrocarbon for further treatment or processing. The adsorbent according to the invention may then be cleaned for further use.

The floating mass is easily recognised and can be recovered or retrieved by normal means including, but not limited to, suction, scoop, filter, or water-porous conveyor belt or is simply floated or scraped off the water. The oil, chemical, or other hydrocarbon may be recovered by means of compression, suction, centrifugal force, or any other suitable type of filter which will not be detrimentally affected by the composition itself, the oil, chemical, or any other hydrocarbon, the water or a combination of the oil, chemical, or other hydrocarbon and the water at the operating temperature and environmental conditions.

When an oil, chemical, or other hydrocarbon spill occurs on land the oil, chemical, or other hydrocarbon may remain on the surface for a time, or penetrate into the surface layer at a rate determined by the type of soil or substrate and by the type of oil, chemical, or other hydrocarbon in the spill. Chemical reactions between the contents of the spill and the soil or substrate will also affect the rate of penetration.

In a similar fashion to the mechanism of treatment and retrieval of oil, chemical and hydrocarbons from water, on land, after application by spraying or spreading, the adsorbent will adsorb the pollutant oil, chemical or hydrocarbon waste and hold it in the form of a gelatinous mass. This mass may then be recovered or retrieved by suitable mechanical means of a scoop, suction or by other suitable means or washing it into a recovery or retrieval point with the use of available water and treated so as to desorb by compression, suction, centrifugal system, or any other type of suitable filter, the oil, chemical or hydrocarbon pollutant for further treatment or processing.

The filter removes the collected oil, chemical, or other hydrocarbon out of the gelatinous mass and recovers or retrieves it for storage, transport or further processing. The composition according to the invention, being substantially, if not totally, cleaned in the filter process, can be immediately returned to the oil, chemical, or other hydrocarbon spill and reused for a number of cycles.

In an embodiment in which the oil, chemical, or other hydrocarbon has leached, or penetrated, or soaked into the soil or environment, cleaning and retrieval is commenced by removing the contaminated soil from its natural or initial location into a water-filled container or bath thus allowing the oil, chemical, or other hydrocarbon to be released into the water. It may be necessary to adjust the temperature of the mixture in the bath and/or cause some agitation of the mixture or use other methods to enhance the release of the oil, chemical, or other hydrocarbon from the soil into the water.

The mixture is then treated as a water-based spill of oil, chemical, or other hydrocarbon by spraying or spreading the adsorbent composition according to the invention onto the mixture by any suitable means and allowing it to collect the oil, chemical, or other hydrocarbon. The resultant gelatinous mass is recovered or retrieved by means of a scoop, suction, floatation, or other suitable means and fed into a compression, suction, or centrifugal, or other type of suitable filter. The filter removes the collected oil, chemical, or other hydrocarbon out of the gelatinous mass and recovers or retrieves it for storage, transport or further processing. The composition according to the invention, being substantially, if not totally, cleaned in the filter process, can be immediately returned to the bath and reused for a number of cycles. When the oil, chemical, or other hydrocarbon has been removed from the bath, the soil can then be removed from the water and soil mixture by any suitable means and dried so that it can be returned to its original location or to an alternate site.

In the event that a small amount of the adsorbent composition according to the invention inadvertently remains in the environment as a result of not being completely recovered or retrieved, the adsorbent composition will be degraded by the ultraviolet light of the sun so that no long-term harm will be done to the environment.

In a preferred embodiment the composition according to the invention may be made by admixing suitable proportions of calcium carbonate, ethyl vinyl acetate, stearic acid, blowing agent, white oil, ti-tree oil, lavender oil, dicumyl peroxide, and zinc oxide in a roller mill, and then subjecting the mixture to a temperature between 70-400° C. and pressure of between approximately one thousand (1,000) and twelve thousand (12,000) tonne per square metre in a seated vessel to allow the chemicals to react to form a polymeric solid of suitable particle size.

In its natural form the composition according to the invention comes in the form of white powder or granule. It may be possible to colour the composition, but care needs to be taken in the development of a colouring agent so that the basic chemical, physical and electrical properties of the composition according to the invention are not adversely affected. Colouring may be used to identify different grades or particle sizes of the product for use in different environments or for different types of spill.

One preferred composition according to the invention is as follows:

| Component | kg |
|---|---|
| polyethylene/ethyl vinyl acetate (18%) [MFI-2 g/10 mins] | 25.00 |
| Azodicarbonamide | 0.89 |
| Dicumyl peroxide | 0.18 |
| Stearic Acid | 0.20 |
| Zinc Oxide | 0.240 |
| Calcium carbonate | 3.570 |

This may be scaled up according to need.

EXAMPLES 1-11

Other examples of composition according to the invention are as follows:

| FUNCTION | COMPONENT | Amount (g) | | | | | | | | | | |
|---|---|---|---|---|---|---|---|---|---|---|---|---|
| | | 1 | 2 | 3 | 4 | 5 | 6 | 7 | 8 | 9 | 10 | 11 |
| blowing agent | Azodicarbonamide (AC2) | 778 | 700 | 530 | 488 | 800 | 773 | 758 | 700 | 443 | 907 | 890 |
| catalyst | Zinc oxide | 195 | 240 | 198 | 156 | 206 | 198 | 226 | 180 | 156 | 188 | 240 |
| lubricant | Stearic acid | 150 | 150 | 150 | 150 | 150 | 150 | 150 | 150 | 150 | 150 | 200 |
| cross linker | (X/L 99%) dicumyl peroxide | 118 | 118 | 106 | 148 | 116 | 106 | 112 | 118 | 148 | 115 | 180 |
| bulking agent | Calcium carbonate | 2248 | 2100 | 2248 | 2248 | 2248 | 2248 | 2248 | 2248 | 2248 | 2248 | 3570 |
| copolymer | EVA FL 00206 | — | 16000 | — | 16000 | — | — | — | 16000 | — | — | |
| | EVA FL 00209 | — | 16000 | — | 16000 | — | — | — | — | — | 16000 | |
| | EVA FL 00212-218 | 16000 | — | 16000 | 16000 | — | 16000 | 16000 | — | — | — | 25000 |
| | EVA VL 00328 | — | — | — | — | 16000 | — | — | — | 16000 | 16000 | |
| colourant | | 200 | 200 | 75 | 200 | 200 | 200 | 200 | 200 | 200 | 200 | |

The step of admixing the components of the composition is exothermic. When a polyethylene/vinylacetate of low MFI is used e.g. about 2 g/10 min, a temperature of about 70-160° C. is desirably maintained in the roller mill. When copolymers of higher MFI are used e.g. 30-600 g/10 min, cold milling is required and it will not be necessary to perform the admixing step at elevated temperature.

During the manufacturing process, other additives may be added according to need and the conditions of the manufacturing process can be altered to enhance the properties of the product or to alter the properties to make the product suitable for other applications. The product may then be granulated by known means if necessary and is subsequently packaged.

The composition according to the invention has been tested with controlled spills on a number of oil, chemical, or other hydrocarbon based products and is found to be able to collect oil, chemical, or other hydrocarbon products ranging from, but not limited to, crude oil through refined oils and fuels to paraffins, waxes, animal and vegetable oils and other hydrocarbons.

EXAMPLE 12

In a test conducted by The Murray-Darling Freshwater Research Center, of New South Wales, Australia, to ascertain the rate of recovery of oil from a contaminated water sample, the following procedure was conducted.

200 ml of distilled water was weighed into a beaker and 20 ml of oil (unspecified) was added. In 1 g increments, a sorbent composition according to example 11 was added until saturation occurred or until the desired result was achieved. The water with oil and product added was stirred to stimulate a wave action. The sorbent product/oil composite was removed with a filter scoop and weighed. The weight of the remaining water was recorded. The oil in the product sample was then analysed using gravimetric method APHA5520B.

The following results were achieved:

| Sample | A | B | C |
|---|---|---|---|
| oil/grease mg/l | 7.5 | 13.0 | 9.0 |
| Petroleum hydrocarbon mg/l | 1.0 | 6.0 | 2.0 |

EXAMPLES 13-16

The following tests were conducted by the Industrial Research Institute of Beirut, Lebanon to test the ability of a sorbent composition according to example 11 to adsorb oils and other hydrocarbons spilled in sand, stones and water.

Example 13

Contaminated Sand and Rocks

Two kilograms of mixed sand and stones contaminated with fuel oil were mixed with 100 g of the sorbent material for 15 minutes. Water at 35° C. (2.5 litres) was added and mixed for another 15 minutes. Floating material was skimmed with a sieve. Sand mixture, remaining water and the skimmed material (weighed 321 g on air dried basis) were tested for oil and grease content. Remaining water was also tested for Biochemical Oxygen Demand ($BOD_5$).

The results were found as follows:

| | Sand mixture | Water | Skimmed material (on air dried basis) |
|---|---|---|---|
| Oil and grease (before treatment) | 7.70 g/kg | <0.1 mg/l | <0.1 mg/l |
| Oil and grease (after treatment) | 291 mg/kg | 3 mg/l | 20 g/kg |
| $BOD_5$ as O | | 18 mg/l | |

Example 14

Sand Mixture Containing 200 q/kg of Fuel Oil

A 400 g sample of "clean" sand and stones mixture was mixed with 100 g of fuel oil and 20 g of the sorbent material.

Water at 35° C. (200 ml) was added and mixed for 15 minutes.

Floating material was skimmed with a sieve (weighed 155 g on air dried basis). Samples were tested and results were found as follows:

| | Sand mixture | Water | Skimmed material (on air dried basis) |
|---|---|---|---|
| Oil and grease (before treatment) | 200 g/kg | <0.1 mg/l | — |
| Oil and grease (after treatment) | 3.5 g/kg | 54 mg/l | 303.6 g/kg |

Example 15

Sea Water Containing 200 g/l Fuel Oil 400 g of fuel oil were mixed with 1.5 litres of sea water.

100 g of the sorbent material was added and mixed for 15 minutes.

Floating material was skimmed with a sieve (weighed 485 g on air dried basis). Water and the recovered floating material were tested for oil and grease. Water was also tested for Biochemical Oxygen Demand ($BOD_5$).

| | Water | Skimmed material (on air dried basis) |
|---|---|---|
| Oil and grease (before treatment) | 200 g/l | |
| Oil and grease (after treatment) | 23 mg/l | 276 g/kg |
| $BOD_5$ as O | 19.5 mg/l | — |

Example 16

Sand Containing 380 g/kg Fuel Oil 400 g of sand and stones were mixed with 250 g of fuel oil. 35 g of the sorbent material were added along with 1 liter of water. Floating material was skimmed with a sieve (weighed 450 g on air dried basis). Tests were performed as described in Ex.13.

| | Sand mixture | Water | Skimmed material (on air dried basis) |
|---|---|---|---|
| Oil and grease (before treatment) | 385 g/kg | <0.1 mg/l | <0.1 mg/kg |
| Oil and grease (after treatment) | 58 g/kg | 725 mg/l | 413 g/kg |

EXAMPLE 17

The following trial on a sorbent composition according to example 11 was conducted by Science Applications International Corporation (SAIC Canada).

The purpose of these tests was to evaluate the sorbent's performance as per the Environment Canada Sorbent Performance Test Program, using ASTM Standard Method of Testing Sorbent Performance of Adsorbents (F726-99). This protocol is based, in part, upon test methods listed in the Canadian General Standards Board Method for Testing Sorbents (CAN/CGSB-183.24), and internal standards initially developed in part by the Emergencies Engineering Technologies Office (formerly the Emergencies Engineering Division) of Environment Canada.

Procedures

Materials and Equipment

Sorbent Description

The following brief description of the sorbent is based on information supplied by the manufacturer and from the quantitative and qualitative observations obtained during testing. Such information is provided since it may be useful when interpreting or comparing results.

The sorbent supplied for testing is described as a granular (non-metallic) material. Two samples of the sorbent particulate were received, one fully white and the other with a coloured fleck (indicated as being for safety reasons—made for defence and government departments only). The coloured fleck sample was used for testing purposes—having a measured density of approximately 0.090 g/cm 3.

Test Liquids

The following test liquids were used:

| Test Liquid | Density (g/cm 3) | Viscosity (cP) | Temperature (° C.) |
|---|---|---|---|
| Diesel | 0.829 | 3 | 20 |
| Light Crude Oil | 0.944 | 290 | 20 |
| Heavy Crude Oil | 0.995 | 2050 | 20 |

Equipment

The following apparatus was used to measure physical and chemical properties of the sorbent and/or test liquids.

| | |
|---|---|
| Density | Anton-Paar DMA 35 hand-held digital densitometer. The unit contains a borosilicate U-shaped oscillating tube and a system for electronic excitation, frequency counting and display. An injected sample volume is kept constant and is vibrated. The density is calculated based on a measurement of the sample oscillation period and temperature. Replicate measurements are conducted and the average density is reported. |
| Viscosity | Brookfield DVII+ viscometer powered by a precision motor and equipped with a beryllium copper spring to measure torque. The degree to which the spring is wound is proportional to the viscosity of the fluid. Several of the following spindles are used per measurement when possible: LVT spindles (#1, #2, #3, #4),. Ultra Low viscosity Adapter (ULA) and spindle, Small Sample Adapter (SSA) and spindles SC4-18, SC4-31. Models are stated to be accurate to within 1% of their full scale range when employed in the specified manner. Readings should be reproducible to within 0.2% of full scale subject to environmental conditions such as variation in fluid temperature. Calibrations are conducted with Brookfield Standard Fluids. |
| Mass | Sample mass is measured using a Mettler PM 4000 analytical balance. The scale resolution is 0.01 g and the reported reproducibility is 0.01 g. |
| Test Cells: | Pyrex 190 mm (diameter) x 100 mm (depth) crystallizing dishes are the typical test cells used although other vessels can be used in order to accommodate special materials |
| Weighing Pans | Non-stick coated pans of 20 cm diameter. |
| Mesh Basket | Mesh baskets (mesh size approximately 1.1 mm diameter) are used to contain and drain Type II (particulate) samples. |
| Shaker Table | An Eberbach Corporation shaker table, modified to hold three 4L jars is used to agitate samples. The table is set at a frequency of 150 cycles per minute with an amplitude of 3 cm. |

Test Protocol

The following summary test protocol which is applicable to Type II (particulate) sorbents was utilized.

The Dynamic Degradation Test

This procedure is designed to determine the buoyancy, hydrophobic and oleophilic properties of a sorbent sample under dynamic conditions. A sorbent sample is placed in a sealed 4 L jar which is half-filled with water. The jar is placed on its side and mounted on a shaker table, set at a frequency of 150 cycles per minute at an amplitude of 3 cm, for a duration of 15 minutes. The contents of the jar are allowed to settle for a period of 2 minutes, after which observations pertaining to the condition of the water and the sorbent sample are recorded. If greater than 10% of the sorbent is observed to sink or the water column is rendered contaminated with sorbent particles, then the sorbent is designated with a Failure and is not recommended for use on open water. The sorbent samples are removed from the jar and the water pick-up ratio is determined.

3 mL of oil is added to the surface of the test jars which have been half-filled with water. The wetted sorbent samples used in the beginning of this procedure are returned to the jar and the container is placed on its side and mounted on the shaker table for an additional 15 minutes. The contents of the jar are allowed to settle for a period of 2 minutes and observations pertaining to the existence of any oil sheen on the surface of the water is noted.

The Oil Adsorption—Short Test (15 Minutes)

This procedure is designed to determine a sorbent's pick-up ratio when placed in a pure test liquid under stagnant conditions. The sorbent sample is initially weighed and the value recorded. A test cell is filled with a layer of test liquid to a depth of approximately 80 mm. The sorbent sample is placed in a fine mesh basket and lowered into the test cell. After 15 minutes, the sorbent is removed from the cell and allowed to drain for 30 seconds (sorbents tested in Heavy Oil are drained for 2 minutes). The sorbent is then transferred to a weighing pan and the weight recorded. All tests are conducted in triplicate.

The Oil Adsorption—Long Test (24 Hours)

This procedure is designed to determine a sorbent's pick-up ratio when placed in a pure test liquid under stagnant conditions. The sorbent sample is initially weighed and the value recorded. A test cell is filled with a layer of test liquid to a depth of approximately 80 mm. The sorbent sample is placed in a fine mesh basket and lowered into the test cell. After 24 hours, the sorbent is removed from the cell and allowed to drain for 30 seconds (sorbents tested in Heavy Oil are drained for 2 minutes). The sorbent is then transferred to a weighing pan and the weight recorded. All tests are conducted in triplicate.

Results and Discussion

Test results are as follows:

The Dynamic Degradation Test

After shaking for 15 minutes and settling for 2 minutes, the bulk of the sorbent material was observed to be floating on the water column. The bulk water remained clear, with little evidence of clouding or colour change.

After shaking for 15 minutes following the addition of 3 mL of oil, there was little evidence of clouding in the water column, however, trace amounts of oil sheen remained on the water surface. Due to these factors the sorbent was deemed to have passed this test and is therefore recommended for use on waterways and for land applications.

| DYNAMIC: DEGRADATION PRE-TEST | | | |
|---|---|---|---|
| | 1 | 2 | 3 |
| Temperature (° C.) | 21 | 21 | 21 |
| Sample weight (g) | 6.13 | 6.19 | 6.50 |
| Weight of wetted sorbent (g) | 33.66 | 35.74 | 21.61 |
| Initial water pickup ratio (g liquid/g sorbent) | 4.5 | 4.8 | 2.3 |
| Average liquid up-take (g liquid/g sorbent) | | 3.9 | |
| Standard Deviation (g liquid/g sorbent) | | 34.7% | |
| Buoyancy test (Pass/Fail) | | Pass | |

Comments:
sorbent floats
lost a significant amount of sorbent through filter.

| COMMENTS | Oil Used | Density (g/cm$^3$) | Viscosity (cP) | Temperature (° C.) |
|---|---|---|---|---|
| | Medium (Crude oil) | 0.944 | 290 | 20 |

The Oil Adsorption—Short Test

Following completion of the above test, new sorbent samples were exposed to a range of test oils. Based on 15 minute exposure and 0.5 or 2 minute drain periods, the sorbent was observed to have the following oil sorption ratios:

| Oil Type | Oil Viscosity (cP) | Pick-up ratio (g oil/g sorbent) |
|---|---|---|
| Diesel fuel | 3 | 7.0 |
| Medium oil | 290 | 10.7 |
| Heavy Oil | 2050 | 5.2 |

The Short L-Test (15 minutes) is the designated test which indicates standard performance.

Short L Test—15 minutes

| | Liquid #1 Sample | | | Liquid #2 Sample | | | Liquid #3 Sample | | |
|---|---|---|---|---|---|---|---|---|---|
| | 1 | 2 | 3 | 1 | 2 | 3 | 1 | 2 | 3 |
| Temperature (° C.) | 19 | 19 | 19 | 19 | 19 | 19 | 19 | 19 | 19 |
| Sample weight (g) | 5.63 | 5.71 | 5.61 | 6.10 | 6.07 | 6.43 | 4.87 | 5.99 | 4.81 |
| Wet sample weight (g) | 40.99 | 47.05 | 48.06 | 70.14 | 72.12 | 74.69 | 34.21 | 33.17 | 28.67 |
| Initial Sorption Capacity (g liquid/g sorbent) | 6.28 | 7.24 | 7.57 | 10.50 | 10.88 | 10.62 | 6.02 | 4.54 | 4.96 |
| Average liquid up-take (g liquid/g sorbent) | | 7.0 | | | 10.7 | | | 5.2 | |
| Standard Deviation (g liquid/g sorbent) | | 9.5% | | | 1.8% | | | 14.8% | |

| DYNAMIC: DEGRADATION TEST | | | |
|---|---|---|---|
| | 1 | 2 | 3 |
| Temperature (° C.) | 23 | 21 | 19 |
| Sample weight (g) | | As above | |
| Persistence of oil sheen on surface (Yes/No) | Yes | Yes | Yes |

Comments
sorbent floats freely/water remains clear
VERY SMALL oil sheen remains on surface: stirred containers after 2 minutes and sheen got smaller List of Possible Comments:
Sorbent: floats freely, 25%150%/75% submerged; sorbent still floating, sinks, dissolves.
Water: remains clear, becomes slightly coloured, becomes cloudy, becomes murky.
Oil: sheen remains on surface, no sheen on surface.

| Liquid Used | Density (g/cm$^3$) | Viscosity (cP) | Temperature (° C.) | Comments |
|---|---|---|---|---|
| Light (Diesel) | 0.829 | 3 | 20 | Float |
| Medium (crude oil) | 0.944 | 290 | 20 | Sorbent floats |
| Heavy (crude/bunker) | 0.995 | 2050 | 20 | Floats, not fully saturated |

Adsorption—Long Test

| Oil Type | Oil Viscosity (cP) | Pick-up ratio (g oil/g sorbent) |
|---|---|---|
| Diesel fuel | 3 | 5.8 |
| Medium oil | 290 | 12.0 |
| Heavy Oil | 2050 | 13.2 |

Long L Test—15 minutes

|  | Liquid #1 Sample | | | Liquid #2 Sample | | | Liquid #3 Sample | | |
| --- | --- | --- | --- | --- | --- | --- | --- | --- | --- |
|  | 1 | 2 | 3 | 1 | 2 | 3 | 1 | 2 | 3 |
| Temperature (° C.) | 19 | 19 | 19 | 19 | 19 | 19 | 19 | 19 | 19 |
| Sample weight (g) | 5.14 | 5.34 | 5.29 | 5.76 | 5.58 | 7.24 | 7.42 | 7.62 | 6.30 |
| Wet sample weight (g) | 33.22 | 36.30 | 38.48 | 71.43 | 75.28 | 95.50 | 104.71 | 107.37 | 91.41 |
| Initial Sorption Capacity (g liquid/g sorbent | 5.46 | 5.80 | 6.27 | 11.40 | 12.49 | 12.19 | 13.11 | 13.09 | 13.51 |
| Average liquid up-take (g liquid/g sorbent) | | 5.8 | | | 12.0 | | | 13.2 | |
| Standard Deviation (g liquid/g sorbent) | | 7.0% | | | 4.7% | | | 1.8% | |

| Liquid Used | Density (g/cm$^3$) | Viscosity (cP) | Temperature (° C.) | Comments |
| --- | --- | --- | --- | --- |
| Light (Diesel) | 0.829 | 3 | 20 | Float |
| Medium (crude oil) | 0.944 | 290 | 20 | Float/sorbent out mostly in one chunk |
| Heavy (crude/bunker) | 0.995 | 2050 | 20 | Float |

CONCLUSIONS

The sorbent material was tested using ASTM F726-99 Protocol in order to evaluate its performance. It passed the buoyancy test by having less than 10% of the product sink under dynamic (wave) conditions.

The sorbent appeared to have reached saturation in all tests except the Short Test in Heavy Oil. This was confirmed by the results of the Long Test, which showed higher values (over 50% higher pick-up ratio when compared to Short Test). There was variability in the testing results which forced repeat testing to be undertaken. Due to the relatively fine particle size of the sorbent it is thought that losses through the test baskets contributed greatly to this variability.

The oil sorption capacities, expressed as weight ratios of liquid sorbed per unit weight of sorbent, varied between 5.2 and 10.7 for the standard 15 minute tests.

It will be evident that the composition according to the invention is uniquely able to be re-used thereby reducing the cost of processing materials, the cost of processing and disposal of waste, and the cost of transport and storage. Moreover the adsorbent composition presents a reduced risk to personnel because it is biodegradable and non-toxic.

The advantages of the process of the invention include, but are not limited to, the use of only non-toxic and biodegradable materials, the ability of the process to return uncontaminated oil, chemical, or other hydrocarbon to the original source of the spill or back to the refinery, and the re-usability of the composition according to the invention after separating it from the oil, chemical, or other hydrocarbon at the site of the spill.

It will be appreciated that the invention goes beyond the scope of the limited disclosure outlined herein above, and that nothing stated herein above should be taken to unnecessarily limit the scope of the invention claimed.

The invention claimed is:

1. A method of manufacturing of an adsorbent polymeric composition for use in retrieving and recycling oils, chemicals or hydrocarbons from land or water environment comprising:

forming an admixture of a polyethylene/vinyl acetate copolymer, a catalyst, a cross linking agent, a lubricant, a blowing agent and a bulking agent;

subjecting said admixture to a pressure of about 12000 tonne/m$^2$; and forming the resultant cake into a shape or form suited to the environment to be treated.

2. The method according to claim 1 wherein the adsorbent polymeric composition is oleophilic.

3. The method as claimed in claim 1 wherein subjecting said admixture to pressure of about 12000 tonne/m$^2$ further includes subjecting said admixture to a temperature in the range of 70-400° C.

4. The method as claimed in claim 1 wherein said polyethylene/vinyl acetate copolymer is a polyethylene/ethyl vinyl acetate copolymer.

5. The method as claimed in claim 1 wherein said polyethylene/vinyl acetate copolymer is present in the composition in an amount of 75-95% w/w.

6. The method as claimed in claim 1 wherein said polyethylene/vinyl acetate polymer is made up of 2-30% w/w vinyl acetate.

7. The method as claimed in claim 1 wherein said catalyst is selected from the group consisting of one or more of zinc oxide, zinc stearate, lead, chromium, copper, cobalt, nickel, silica, compounds or ionic forms thereof and is present in amounts of 0.2-2.0% w/w.

8. The method as claimed in claim 1 wherein said crosslinking agent is selected from the group consisting of one or more of diacyl peroxide, dialkyl peroxide, ketone peroxide, peroxy dicarbonates, peroxy esters, tertiary alkyl hydroperoxides, tertiary amyl peroxides, acid chlorides or hydrogen peroxides and is present in amounts of 0.2-1.8% w/w.

9. The method as claimed in claim 1 wherein the bulking agent is selected from the group consisting of calcium carbonate or talc and is present in amounts of up to 25% w/w.

10. The method as claimed in claim 1 wherein the lubricant is a fatty acid.

11. The method as claimed in claim 1 wherein the admixture further includes one or more of odour masking agents, antimicrobial agents, antifungal agents, wetting agents, colourants or dyes.

12. The method as claimed in claim 1 wherein the admixture further includes polyethylene/ethyl vinyl acetate, blowing agent, dicumyl peroxide, stearic acid, zinc oxide and calcium carbonate.

* * * * *